United States Patent
Kumar et al.

(10) Patent No.: US 8,560,833 B2
(45) Date of Patent: Oct. 15, 2013

(54) AUTOMATIC SECURE CLIENT ACCESS

(75) Inventors: Chetan R. Kumar, Bangalore (IN); Charumathy Venkatraman, Bangalore (IN); Suman Maradani, Koramangala (IN)

(73) Assignee: Aruba Networks, Inc., Sunnyvale, CA (US)

(*) Notice: Subject to any disclaimer, the term of this patent is extended or adjusted under 35 U.S.C. 154(b) by 210 days.

(21) Appl. No.: 12/916,287

(22) Filed: Oct. 29, 2010

(65) Prior Publication Data

US 2012/0110320 A1    May 3, 2012

(51) Int. Cl.
| | |
|---|---|
| H04L 29/06 | (2006.01) |
| G06F 9/00 | (2006.01) |
| G06F 15/16 | (2006.01) |
| G06F 17/00 | (2006.01) |
| G06F 11/00 | (2006.01) |
| G06F 12/14 | (2006.01) |
| G06F 12/16 | (2006.01) |
| G06F 15/173 | (2006.01) |
| G08B 23/00 | (2006.01) |

(52) U.S. Cl.
USPC ............. 713/151; 726/15; 726/23; 709/238

(58) Field of Classification Search
USPC ........................................................ 713/151
See application file for complete search history.

(56) References Cited

U.S. PATENT DOCUMENTS

| | | | | |
|---|---|---|---|---|
| 5,828,832 A * | 10/1998 | Holden et al. | .................. | 726/12 |
| 5,828,893 A * | 10/1998 | Wied et al. | .................... | 709/229 |
| 6,353,886 B1 * | 3/2002 | Howard et al. | .............. | 713/156 |
| 6,571,338 B1 * | 5/2003 | Shaio et al. | ..................... | 726/13 |
| 6,986,042 B2 * | 1/2006 | Griffin | .......................... | 713/164 |
| 7,251,824 B2 * | 7/2007 | Edwards et al. | .................. | 726/4 |
| 7,318,097 B2 * | 1/2008 | Bernoth | ........................ | 709/225 |
| 7,386,889 B2 * | 6/2008 | Shay | ................................ | 726/26 |
| 7,478,427 B2 * | 1/2009 | Mukherjee et al. | ............. | 726/15 |
| 7,480,794 B2 * | 1/2009 | Kersey et al. | ................. | 713/153 |
| 7,496,347 B2 * | 2/2009 | Puranik | ........................ | 455/410 |
| 7,757,278 B2 * | 7/2010 | Boneh et al. | .................... | 726/12 |
| 7,847,959 B2 * | 12/2010 | Love | ........................... | 358/1.14 |
| 7,882,247 B2 * | 2/2011 | Sturniolo et al. | ............. | 709/228 |
| 7,917,751 B2 * | 3/2011 | Keohane et al. | ............. | 713/165 |

(Continued)

OTHER PUBLICATIONS

Yahoo Answers, What is a routable IP address?, 2008, access at http://answers.yahoo.com/question/index?qid=20080417123113AA5qcS6.*

*Primary Examiner* — Carolyn B Kosowski
(74) *Attorney, Agent, or Firm* — Blakely, Sokoloff, Taylor & Zafman LLP

(57) ABSTRACT

Providing secure network access in a networked client device. A client device is provided with a secure connection adapter. In operation, the secure connection adapter detects the network environment of the client device and determines of the network environment is trusted or untrusted. If the client device is operating in an untrusted network environment, the secure connection adapter establishes a secure connection to an enterprise host using a secure tunnel such as IPSec, SSL, or other secure connection. Programs executing on the client device now operate in the secure network environment, with all network activity routed through the secure connection to the enterprise. Optionally, a split tunnel mechanism may be used to direct some network traffic directly to the Internet from the client device.

21 Claims, 2 Drawing Sheets

(56) References Cited

U.S. PATENT DOCUMENTS

| | | | |
|---|---|---|---|
| 7,925,693 B2 * | 4/2011 | Swander et al. | 709/203 |
| 7,937,753 B2 * | 5/2011 | Hodges et al. | 726/12 |
| 7,958,551 B2 * | 6/2011 | Hibino | 726/14 |
| 7,975,294 B2 * | 7/2011 | Heninger et al. | 726/15 |
| 8,161,547 B1 * | 4/2012 | Jennings et al. | 726/22 |
| 2003/0204748 A1 * | 10/2003 | Chiu | 713/201 |
| 2006/0265737 A1 * | 11/2006 | Morris | 726/3 |
| 2007/0214273 A1 * | 9/2007 | Kacker et al. | 709/229 |
| 2009/0133115 A1 * | 5/2009 | Heninger et al. | 726/15 |
| 2010/0049970 A1 * | 2/2010 | Fraleigh et al. | 713/156 |

* cited by examiner

AUTOMATIC SECURE CLIENT ACCESS

BACKGROUND OF THE INVENTION

The present invention relates to digital networks, and in particular, to automatically providing secure access on digital client devices.

Digital networks have rapidly become the backbone of many enterprises, small and large. Within an enterprise, these networks, often called Intranets, are secured from outside attack and intrusion by firewalls, filters, gateways, and other defensive structures. In addition to these protective structures, enterprise intranets often provide secure access to other resources such as mail servers, file servers, databases, printing, and the like. When a client is operating inside the enterprise, connected to the enterprise intranet whether by a wired or wireless connection, they operate under the protective umbrella of the enterprise, provided with secure access to resources.

In contrast, when an enterprise user connects to the wider Internet outside the protective structures of the enterprise, they do so without benefit of enterprise protection, and without access to secure enterprise resources.

Solutions exist, such as tunneling and Virtual Private Networks (VPNs) to provide secure access through the Internet to enterprise resources.

While technology savvy users understand the risks associated with connecting directly to the Internet, and use tunneling protocols and/or VPN access with ease to establish secure access to enterprise resources, such concepts and tools are more challenging to non-savvy users, such as corporate executives, not understanding the differences between secured and unsecured network connections. Yet these users are often the most vocal about needing access to enterprise resources, and are the most vulnerable to threats in an unsecured environment.

What is needed is a way of automatically providing secure client access to enterprise resources, independent of network connection.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of automatically providing secure access in a client device.

According to the present invention, a secure connection adapter is installed in a digital client device. The client device is a network-enabled device such as a computer, laptop, notebook, tablet, smart phone, or other digital device with network connectivity, wired and/or wireless. In operation, the secure connection adapter detects the network environment to which the (client) device is connected. If the device is on an untrusted network, the secure connection adapter establishes a secure connection to the enterprise network. This secure connection may be made through IPSec, SSL, or other secure mechanisms. Through the secure connection, the device is provided an IP address from the corporate IP server, and provided secure access to enterprise resources. Optionally through split-tunnel operation, the secure connection adapter may also provide direct access to the Internet or local network resources, rather than routing all such requests through the enterprise network.

Figure 1:
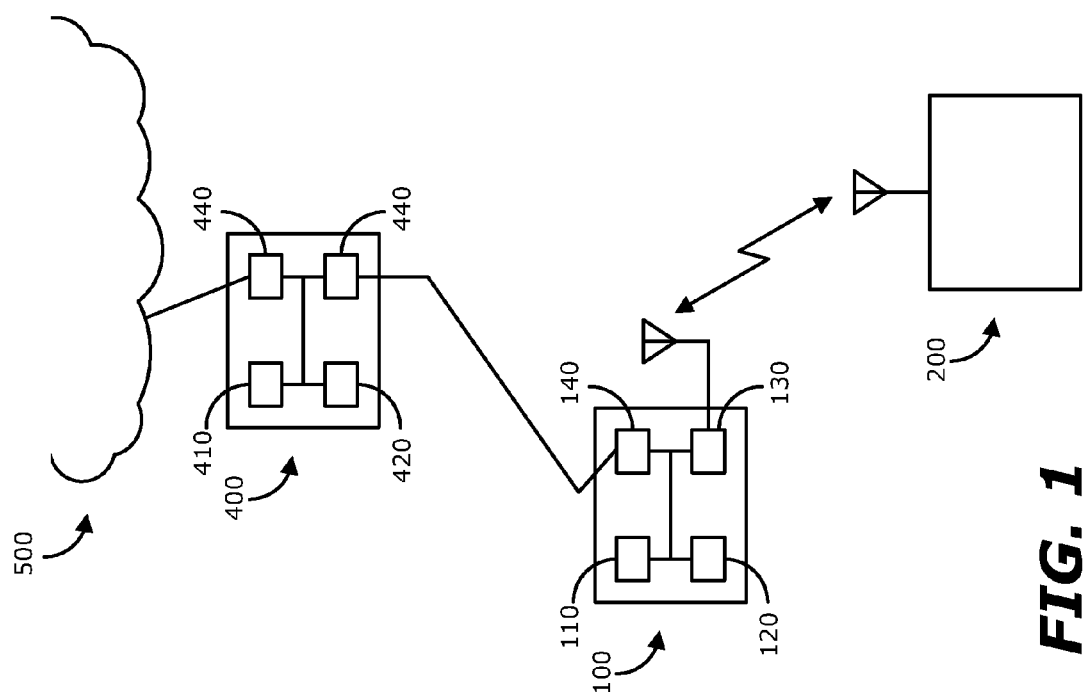
FIG. 1 shows clients in a network.

FIG. 1 shows a network in which access points (APs) 100 are purpose-made digital devices, each containing a processor 110, memory hierarchy 120, and input-output interfaces 130. In one embodiment of the invention, a MIPS-class processor such as those from Cavium or RMI is used. Other suitable processors, such as those from Intel or AMD may also be used. The memory hierarchy 120 traditionally comprises fast read/write memory for holding processor data and instructions while operating, and nonvolatile memory such as EEPROM and/or Flash for storing files and system startup information. Wired interfaces 140 are typically IEEE 802.3 Ethernet interfaces, used for wired connections to other network devices such as switches, or to a controller. Wireless interfaces 130 may be WiMAX, 3G, 4G, and/or IEEE 802.11 wireless interfaces. In one embodiment of the invention, APs operate under control of a LINUX operating system, with purpose-built programs providing host controller and access point functionality. Access points 100 typically communicate with a controller 400, which is also a purpose-built digital device having a processor 410, memory hierarchy 420, and commonly a plurality of wired interfaces 440. Controller 400 provides access to network 500, which may be a private intranet or the public internet.

Client devices 200 have similar architectures, chiefly differing in input/output devices; a laptop computer will usually contain a large LCD, while a handheld wireless scanner will typically have a much smaller display, but contain a laser barcode scanner. A laptop computer makes a good rogue.

According to the present invention, a secure client package is installed on the client device 200. This package is tailored to the operating system on the device, such as OS X, Windows XP, Windows Vista, Windows 7, or a Linux distribution. The package is installed and configured; this may be accomplished for example by the user of the device running one or more installation scripts. Installation and configuration may include authentication, and installation of profiles and additional authentication materials such as certificates.

Figure 2:
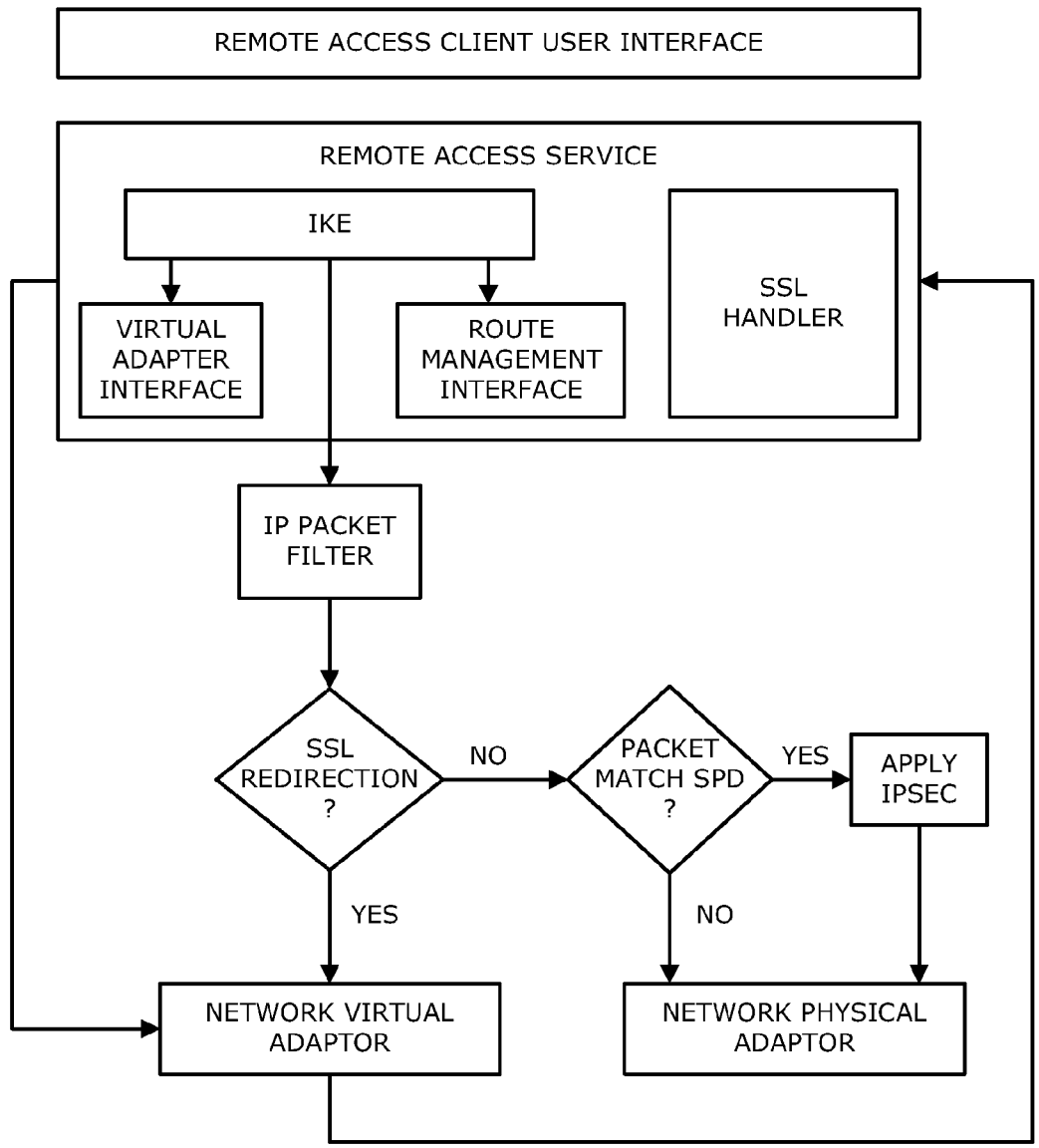
FIG. 2 shows a block diagram of a secure connection adapter.

According to the present invention, in operation and as shown in FIG. 2, the secure client adapter hooks into the networking stack of the client operating system, typically by providing a network virtual adapter. This is accomplished using operating-system dependent mechanisms. By hooking into the networking stack of client device 200 and providing a service such as a virtual network adapter, the secure connection adapter is able to transparently provide secure network access to all programs using networking resources on the client device.

Corporate bound traffic is intercepted by the IP packet filter and uses either IPSec or SSL to forward the packet through a secure connection. Incoming corporate IPSec traffic is intercepted by the IP packet layer which after performing security operations forwards the packet to Network virtual adapter. In the case when SSL is used as access mechanism the packets are handled by the SSL handler and the packet is forwarded to Network virtual adapter after performing security operations.

The typical deployment scenario will have a remote client in the public network or behind a NAT device and controller 400 is also behind a Firewall/NAT device. The NAT device maps the external IP address (ISP routable) to the internal IP address that can be assigned to any one of the available interfaces.

A separate VLAN can be created for the internal (Corp) resources that will be available to the client only when the client 200 is inside the network (Intranet) or when it has a IPSec tunnel to the controller.

A secure network client profile is a collection of all the configuration items required by a secure network client. One of the configuration items in the profile is an internal IP address. After the secure network client has been installed on the user's machine, the secure network application prompts the user to authenticate with controller 400 and download a secure network profile.

Configuring Trusted Resources:

An Internal (non-routable) IP address can be assigned to one of the available interfaces on controller 400 and the IP address is made available to client 200 through the secure connection profile. This interface or port will not reachable to the clients outside the intranet.

A separate web server can be deployed in the intranet, which will be accessible to all authenticated clients in the intranet and is capable of terminating requests on port 443 (HTTPS).

According to the invention, the secure network client will auto-launch a secure remote session to controller 400 when client 200 has network connectivity and is connected to an un-trusted network.

As an example, client 200 makes a HTTPS request to the internal IP of the controller 400. If the response contains a unique identifier then client 200 is in the trusted network.

Example

```
Request from client is
HEAD /via/login?tc HTTP/1.1
Host: <internal_ip>
Keep-Alive: 300
Connection: keep-alive
Response from Server
HTTP/1.x 401 Authorization Required
Date: Mon, 18 May 2009 14:29:45 GMT
Expires: 0, 0
   X-VIA: <trust validation header>
Set-Cookie: VIA_SESSION=; path=/via;
Content-Length: 3908
Connection: close
Content-Type: text/html
```

The trust validation header contains additional information used to validate if the client is coming from a trusted network.

If this connection attempt fails, the client device is connected to an untrusted network, and a secure connection must be established.

As described, determining if the client is operating in a trusted or untrusted networking environment may be done in a number of ways. One way to verify that the client is operating in a trusted network environment is to attempt to connect to a resource that is only available and accessible in the trusted network environment. This may be, for example, a server, mail system, database, or other resource only available in the trusted environment. Additional authentication may optionally be performed with the resource, providing additional verification that the client is operating in a trusted network environment. The most simple configuration is to create a private vlan ip with a private IP address that is not routable outside the trusted network (Ex 10/8 or 172.16/12 or 192.168/16). Non-routable IP addresses are described for example in RFC 1918, RFC 3879, RFC 4193, RFC 5735, and RFC 3927.

If the secure client adapter determines that the client is operating in an untrusted network environment, the secure client adapter initiates a secure connection to the pre-programmed enterprise host such as controller 400. This secure connection may be in the nature of an IPSEC or other secure tunnel, a SSL connection, or other secure connection. Establishing the secure connection may result in client device 200 being provided with an IP address from an enterprise DHCP server.

With the secure connection in place, programs executing on client device 200 now operate as if executing within the trusted enterprise networking environment, transparent to those programs, with network traffic passing through the secure client adapter and the secure connection. In one mode of operation, all networking operations are routed through the secure connection and through the enterprise host. In an optional operating mode, depending on connection profiles which may be downloaded from the enterprise host, the secure connection adapter may operate in split-tunnel mode, allowing some networking requests to go directly to the Internet, bypassing the secure tunnel. As an example, a client browser accessing CNN.COM may be routed directly to the Internet using the split tunnel, rather than routing such a request through the secure connection and through enterprise resources.

The present invention may be realized in hardware, software, or a combination of hardware and software. The present invention may be realized in a centralized fashion in one computer system such as client 200, or in a distributed fashion where different elements are spread across several interconnected computer systems. A typical combination of hardware and software may be a controller or access point with a computer program that, when being loaded and executed, controls the device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:
1. A method comprising:
transmitting, by a first device, a first message directed to an IP address in a particular network, wherein the IP address in the particular network is a non-routable IP address such that the non-routable IP address is not routable by devices outside of the particular network and the non-routable IP address is routable by devices within the particular network;
responsive to determining that a second device at the IP address within the particular network received the first message, determining that the first device is within the particular network; and responsive to determining that the second device at the IP address within the particular network did not receive the first message, determining that the first device is outside the particular network.

2. The method of claim 1 wherein determining that the second device at the IP address is within the particular network received the first message comprises:
receiving, by the first device, a second message from the second device at the IP address within the particular network.

3. The method of claim 1 wherein the first message is a request to access network resources in the particular network.

4. The method of claim 1 further comprising:
responsive to determining that the first device is outside the particular network, establishing by the first device a secure connection with a third device in the particular network, the third device using an IP address that is routable by devices outside of the particular network.

5. The method of claim 4 wherein the third device forwards information received from the first device to the second device.

6. The method of claim 4 where the secure connection is one or more of a VPN, IPSec tunnel, SSL connection, or other secure connection.

7. The method of claim 4 further comprising:
intercepting data traffic addressed to one or more devices, other than the third device, in the particular network;
forwarding the data traffic to the third device in the particular network via the secure connection.

8. A non-transitory machine readable medium having a set of instructions stored in nonvolatile form therein, which when executed by at least one processor causes a set of operations to be performed comprising:
transmitting, by a first device, a first message directed to an IP address in a particular network, wherein the IP address in the particular network is a non-routable IP address such that the non-routable IP address is not routable by devices outside of the particular network and the non-routable IP address is routable by devices within the particular network;
responsive to determining that a second device at the IP address within the particular network received the first message, determining that the first device is within the particular network; and
responsive to determining that the second device at the IP address within the particular network did not receive the first message, determining that the first device is outside the particular network.

9. The medium of claim 8 wherein determining that the second device at the IP address is within the particular network received the first message comprises:
receiving, by the first device, a second message from the second device at the IP address within the particular network.

10. The medium of claim 8 wherein the first message is a request to access network resources in the particular network.

11. The medium of claim 8 further comprising:
responsive to determining that the first device is outside the particular network, establishing by the first device a secure connection with a third device in the particular network, the third device using an IP address that is routable by devices outside of the particular network.

12. The medium of claim 11 wherein the third device forwards information received from the first device to the second device.

13. The medium of claim 11 where the secure connection is one or more of a VPN, IPSec tunnel, SSL connection, or other secure connection.

14. The medium of claim 11 further comprising:
intercepting data traffic addressed to one or more devices, other than the third device, in the particular network;
forwarding the data traffic to the third device in the particular network via the secure connection.

15. A device comprising:
at least one hardware processor;
the device configured to perform operations by executing instructions using the at least one hardware processor, the operations comprising:
transmitting, by a first device, a first message directed to an IP address in a particular network, wherein the IP address in the particular network is a non-routable IP address such that the non-routable IP address is not routable by devices outside of the particular network and the non-routable IP address is routable by devices within the particular network;
responsive to determining that a second device at the IP address within the particular network received the first message, determining that the first device is within the particular network; and
responsive to determining that the second device at the IP address within the particular network did not receive the first message, determining that the first device is outside the particular network.

16. The medium of claim 15 wherein determining that the second device at the IP address is within the particular network received the first message comprises:
receiving, by the first device, a second message from the second device at the IP address within the particular network.

17. The medium of claim 15 wherein the first message is a request to access network resources in the particular network.

18. The medium of claim 15 further comprising:
responsive to determining that the first device is outside the particular network, establishing by the first device a secure connection with a third device in the particular network, the third device using an IP address that is routable by devices outside of the particular network.

19. The medium of claim 18 wherein the third device forwards information received from the first device to the second device.

20. The medium of claim 18 where the secure connection is one or more of a VPN, IPSec tunnel, SSL connection, or other secure connection.

21. The medium of claim 18 further comprising:
intercepting data traffic addressed to one or more devices, other than the third device, in the particular network;
forwarding the data traffic to the third device in the particular network via the secure connection.

* * * * *